United States Patent Office 3,443,317
Patented May 13, 1969

3,443,317
METHOD AND DEVICE FOR DETERMINING AND MEASURING CHANGES IN THE SHAPE OF NUCLEAR REACTOR FUEL ELEMENTS
Bernd Grahmann, Erlangen-Buchenbach, Germany, assignor to Siemens Aktiengesellschaft, Berlin-Siemensstadt, Germany, a corporation of Germany
Filed Aug. 2, 1966, Ser. No. 569,693
Claims priority, application Germany, Aug. 4, 1965, S 98,635
Int. Cl. G01b 13/00
U.S. Cl. 33—174                                       3 Claims

ABSTRACT OF THE DISCLOSURE

A device for determining and measuring changes in the shape of nuclear fuel elements of the type having a guide tube of rectangular cross section wherein bodies bearing fissionable material are received which includes a holder having a support for a fuel element and two sensing cylinders with respective pistons guidable therein and exposed to a hydraulic medium contained therein, the fuel element support and the piston being movable relative to one another so that the pistons and at least one outer surface of the fuel element are passed relatively along one another in the longitudinal direction of the fuel element.

---

My invention relates to method and device for determining and measuring changes in the shape of nuclear reactor fuel elements and more particularly, for determining changes in shape along the entire length thereof and for having those changes indicated at a desired distance from the measuring location.

In nuclear reactors, fuel elements have been used which consist essentially of a guide tube with rectangular or square cross section and bodies containing the fissionable material inserted therein. Openings can be provided in the lateral surfaces of the guide tube, through which a liquid or gaseous coolant can flow into the interior of the guide tube or out of the same. Since the fuel elements have to be inserted in the reactor vessel by means of remotely controlled devices, the dimensions and the cross section must not deviate from the permissible values. It is therefore imperative to inspect the fuel element before its insertion in the reactor vessel for deviations of its cross section, twists and bends along its longitudinal direction.

It is accordingly an object of my invention to provide method and apparatus for determining and measuring changes in the shape of nuclear reactor fuel elements which will provide accurate measurements that are indicated at a safe distance from the measuring location.

With the foregoing and other objects in view, I provide in accordance with my invention, a method of determining and measuring changes in the shape of nuclear reactor fuel elements which comprises sensing along the longitudinal direction thereof at least one outer surface of the guide tube, which is inserted in a holder, by means of a piston exposed to an hydraulic medium and guided in a cylinder, and evaluating by means of movement of the piston, volume changes produced in the sensing cylinders with the aid of at least one measurement cylinder due to a change in the shape of the outer surface.

Further in accordance with my invention I provide device for determining and measuring changes in the shape of nuclear reactor fuel elements comprising two sensing cylinders on one side respectively of a measuring piston attached to the measuring cylinder. The piston of the measuring cylinder is mechanically connected to an indicating device. Expediently in accordance with a further feature of my invention, the device is provided with an additional measuring cylinder having a piston biased on one side which is adapted to actuate an instrument for indicating the edge dimension or a bend in the guide tube. A pressure producer is connected to the conduits interconnecting the measuring cylinder and the sensing cylinders for applying the sensing piston to the surface of the guide tube which is being inspected.

Other features which are considered as characteristic for the invention are set forth in the appended claims.

Although the invention is illustrated and described herein as method and device for determining and measuring changes in the shape of nuclear reactor fuel elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description when read in connection with the accompanying drawings, in which.

Figure 1:
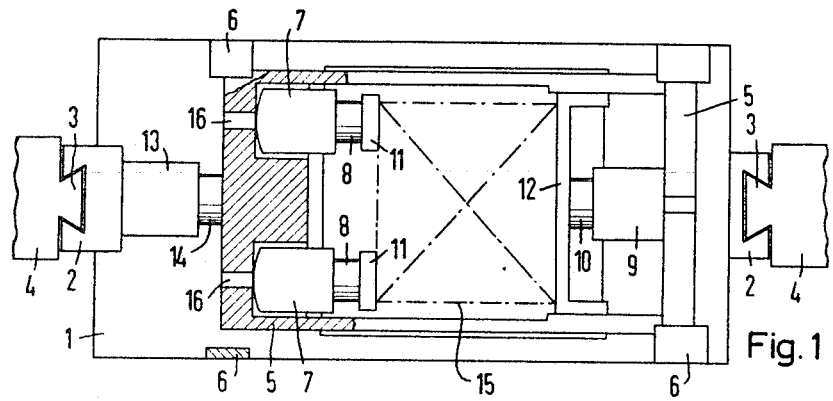
FIG. 1 is a top plan view of the measuring device constructed in accordance with my invention.
Figure 2:
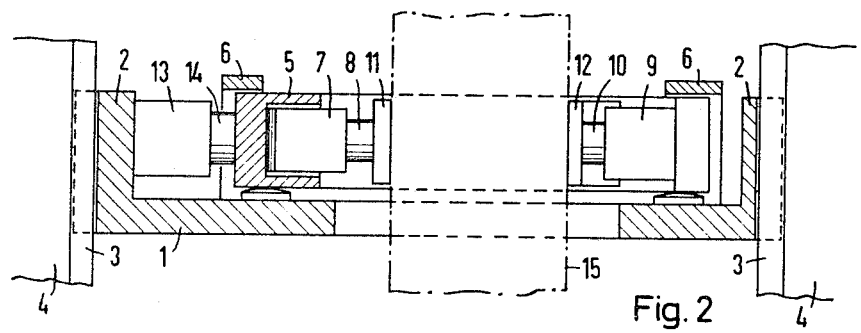
FIG. 2 is a longitudinal section of the device of FIG. 1 rotated through an angle of 90° about its longitudinal axis.

Referring now to the drawing and first, particularly, to FIGS. 1 and 2 thereof, there is shown a base frame 1 which is mounted for vertical displacement with the aid of guide elements 2 for example formed with a notch slideway, on rails or posts 4 having corresponding guide elements 3 for example dovetail extensions slidably inserted in the notch slideway of the guide elements 2. On the base frame 1, a measuring frame 5 is movably guided in claw-like brackets 6.

Two cylinders 7 are revolvably mounted in the measuring frame 5 in a horizontal position while a further cylinder 9 is rigidly secured to the measuring frame 5. A piston 8 extends into each of the cylinders 7 and is provided at its free end with a plate-like measuring shoe 11 having, for example, a square face. A measuring plate 12 is secured to the free end of the piston 10, which extends into the cylinder 9, and is provided with lateral surfaces that are guided in the frame 5. An additional measuring means is located between the base frame 1 and the measuring frame 5, and comprises a cylinder 13 fixed to the base frame 1 and a piston 14 fixed to the measuring frame 5. The fuel element 15, shown in phantom in FIGS. 1 and 2, is inserted in the space between the measuring shoes 11 and the measuring plate 12. When inspecting fuel elements provided with a guiding tube that has no openings therein, the measuring shoes 11 can be dispensed with.

Figure 3:
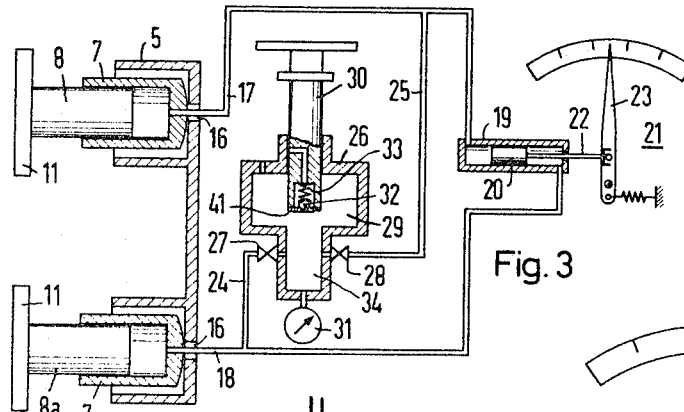
FIG. 3 is a schematic view of the measuring system employing the device of FIG. 1.

The measuring system for the cylinders 7 according to the invention is schematically illustrated in FIG. 3. A conduit 17, 18 respectively communicates with the cylinders 7 at the bottoms thereof and extends through bores 16 provided in the measuring frame 5. The conduit 17 is connected to one end of a measuring cylinder 19 and the conduit 18 is connected to the other end of the measuring cylinder 19 so as to communicate with respective end faces of the free-floating measuring piston 20. The measuring piston 20 acts, for example directly on the indicator arm 23 of an indicating instrument 21, mechanically through a push rod 22 having a U-shaped bracket at the end thereof for engaging a pin secured to the indicator arm 23. As can be seen in FIG. 3, the indicator arm is suitably biased by the tension spring which tends to return the indicator arm 23 to its neutral position on the indicating scale shown. Because the rod 22 is fixed to the right-hand end face of the piston 20 as shown in FIG. 3, that right-hand end face accordingly has a smaller effective or exposed area than the area of the left-hand end face of the piston 20. In order that the same conditions may exist at both ends of the measuring piston 20, the effective end face area of the piston 8a (FIG. 3) must be smaller than the area of the piston 8 by an amount corresponding to the cross-sectional area of the push rod 22. A manually operated pressure-producing device or hand pump assembly 26, for example, is connected by branch conduits 24 and 25 to the main conduits 18 and 17 respectively. Check valves 27 and 28 are provided respectively in the branch conduits 24 and 25. The pressure-producing device includes a liquid receptacle 29, an actuating piston 30 and, for example, a pressure indicator 31. When the piston 30 is pushed downwardly, as viewed in FIG. 3, liquid is forced out of the liquid supply receptacle 29 into the branch measuring conduits 24 and 25 and accordingly into the conduits 18 and 17, respectively. When the piston 30 of FIG. 3 is drawn upwardly, a valve located at the free end of the piston 30 within the receptacle 29 and which is formed for example by a ball 32 at the end of a compression spring 33 located within a recess of the piston 30 and in biasing engagement with a flap 41 causes measuring liquid from the liquid receptacle 29 to be delivered to the pump cylinder 34. The check valves 27 and 28 prevent the liquid from being sucked back into the cylinder 34 from the respective branch conduits 24 and 25. The valve built into the piston 30 thus forms a combination suction and high-pressure or overpressure valve so that a constant pressure can be produced in the measuring conduits 17 and 18.

Figure 4:
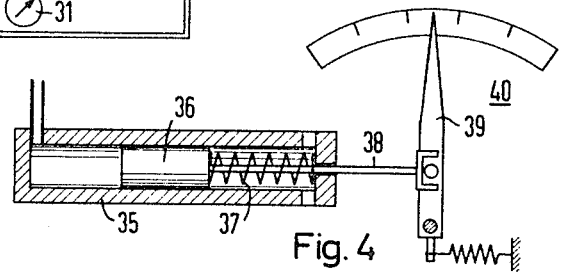
FIG. 4 is an enlarged schematic view of a measuring piston forming a fragment of the system shown in FIG. 3.

The cylinders 9 and 13 communicate with a measuring cylinder 35 (FIG. 4). The free-floating piston 36 of the cylinder 35 is engaged only on one end face by the measuring liquid, i.e. the left-hand end face thereof as viewed in FIG. 4. The other end face of the piston 36 is biased by a restoring compression spring in the measuring cylinder 35 which tends to return it to a neutral position, and is connected for example with a push rod 38 similar to the push rod 22 of the piston 20 (FIG. 3) for appropriately turning the indicating arm 39 of the indicating instrument 40 about its pivot against the bias of the tension spring connected thereto as shown in FIG. 4. The connecting conduits between the cylinders 9 and 13 and the associated measuring cylinders 35 are connected by branch conduits (not shown) with the pressure-producing device 26.

The fuel element 15 which, in the example of FIG. 1, has a square cross section, is inserted in the device of the invention and held in a non-illustrated base plate. By actuating the pressure-producing device 26, a pressure is produced in the measuring system which is limited by the valve in the piston 30 of the pressure-producing device 26, and the measuring shoes 11 and measuring plate 12 are thereby applied to the jacket surfaces of the fuel element. Then, the base frame 1 of the device of the invention is caused to travel in the dovetail guides 2 and 3 along the entire length of the fuel element. The measuring shoes accordingly follow the distortions and twisting of the outer jacket of the fuel element. The consequent movements of the measuring shoes then become detectable by the volume changes produced by the pistons 8 in the cylinders 7. These volume changes thus effect the position of the measuring piston 20 in the measuring cylinder 19 and are indicated by the indicating instrument 21 which, for example, can be calibrated in units of 1/10 mm. Due to the ratio of the larger end face areas of the pistons 8 to the relatively small end face areas of the piston 20, small displacements of the pistons 8 are translated into relatively large displacements of the piston 20.

By the displacements of the measuring plate 12, the volume changes occurring in the cylinder 9 indicate bends in the fuel element. When a bend is detected in the fuel element, the entire measuring frame 5 assumes a position in which it is turnd in the direction of the bend. For example, if in FIG. 2 the fuel element 15 had an upper bend toward the right-hand side of the figure, as the bend entered into the space between the measuring shoes 11 and 12, both the pistons 8 and 10 would be shifted toward the right-hand side of the figure and, pursuant to the flow of hydraulic medium through non-illustrated branch conduits from the pressure-producing device 26 (FIG. 3) coming from the cylinder 7, for example, and delivered to the cylinder 13 (FIG. 2), for example, the piston 14 would then also shift to the right-hand side so that the entire frame 5 is thus turned in the direction of the bend. The volume variations produced in the cylinder 13 by the displacement of the piston 14 are a measure of the deviations or variations in the width or thickness of the fuel element. The volume changes in the cylinders 9 and 13 are registered by respective measuring cylinders 35 and indicated by an indicator gauge 40.

The measurements are independent of liquid pressure so that frictional effects are eliminated. The measuring system according to the invention is distinguished by its dependability and ruggedness.

I claim:
1. Device for determining and measuring changes in the shape of nuclear fuel elements of the type having a guide tube of rectangular cross section wherein bodies bearing fissionable material are received, comprising holder means including a support for a fuel element and sensing means including two sensing cylinders and respective pistons guidable in said cylinders and exposed to an hydraulic medium contained in said cylinders, said fuel element support and said pistons being movable relative to one another so that the pistons and at least one outer surface of the fuel element are passed relatively along one another in the longitudinal direction of the fuel element whereby the pistons are displaceable transversely to the longitudinal direction of the fuel element in response to a change in the shape of the surface so that a variation in the volume of the respective cylinders is produced, a measuring cylinder for evaluating the change in the shape of the surface, said measuring cylinder communicating at opposite ends thereof with the respective sensing cylinders for receiving therefrom hydraulic medium displaced by a decrease in volume of the respective cylinders, said measuring cylinder containing a piston freely slidable within said measuring cylinder and alternately displaceable toward the ends of said measuring cylinder in response to the amount of hydraulic medium received from said sensing cylinders at the ends of said measuring cylinder, and including two additional sensing cylinders communicating respectively with one end of respective additional measuring cylinders so as to pass hydraulic medium to the respective end face of a piston in said respective additional measuring cylinders in response to a bend in the fuel element, and indicating means operatively connected respectively with said measuring cylinders for indicating the amount of bending.

2. Device according to claim 1 wherein said piston of said first-mentioned measuring cylinder is operatively connected with an indicating instrument.

3. Device according to claim 1 wherein said sensing cylinders and the ends of said first-mentioned measuring cylinder communicate through connecting conduits, and pressure-producing means connected with said conduits.

References Cited

UNITED STATES PATENTS

| | | | |
|---|---|---|---|
| 1,107,298 | 8/1914 | Haas | 73—419 |
| 1,557,846 | 10/1925 | Kallensee. | |
| 1,954,442 | 4/1934 | Dall et al. | |
| 2,930,283 | 3/1960 | Smith et al. | |
| 3,080,659 | 3/1963 | Wolford. | |
| 3,181,246 | 5/1965 | Jenkins et al. | |
| 3,193,940 | 7/1965 | Jenkins. | |

SAMUEL S. MATTHEWS, *Primary Examiner.*